United States Patent [19]

Jacob et al.

[11] 4,218,420
[45] Aug. 19, 1980

[54] HOSE CURING METHOD

[75] Inventors: Richard J. Jacob; Reuben Wolk, both of Dayton, Ohio

[73] Assignee: Dayco Corporation, Dayton, Ohio

[21] Appl. No.: 31,570

[22] Filed: Apr. 18, 1979

[51] Int. Cl.² .................... B29H 5/01; B29C 25/00; B29D 23/00; B29H 7/14
[52] U.S. Cl. .................... 264/570; 425/446; 425/384; 425/392; 425/391; 425/387.1; 425/404; 264/325; 249/79
[58] Field of Search .................... 425/387.1, 383, 391, 425/404, 445, 446, DIG. 42, 392; 249/57, 79, 81; 264/325, 570, 573

[56] References Cited

U.S. PATENT DOCUMENTS

| 2,330,762 | 9/1943 | Tooker | 425/DIG. 42 |
|---|---|---|---|
| 3,406,430 | 10/1968 | Furstenburg et al. | 425/DIG. 42 |
| 3,651,861 | 3/1972 | Deuring | 425/DIG. 42 |
| 3,665,069 | 5/1972 | Richmond | 425/DIG. 42 |
| 3,690,796 | 9/1972 | Borsvold | 425/383 X |

Primary Examiner—J. Howard Flint, Jr.
Attorney, Agent, or Firm—Reuben Wolk

[57] ABSTRACT

A method of curing a polymeric hose are provided wherein a hose to be cured is confined within a tubular preformed spiral confining wall of a mold structure to thereby provide optimum support for the exterior surface of such hose during curing which assures provision of a precision outside surface yet enables curing of a substantial length of hose in a comparatively compact volume.

10 Claims, 14 Drawing Figures

HOSE CURING METHOD

BACKGROUND OF THE INVENTION

1. Field of the Invention

This invention relates to polymeric hose and in particular to an apparatus for and method of curing such hose.

2. Prior Art Statement

It is known in the art to vulcanize or cure predetermined lengths of polymeric hose while confining the exterior surface of each hose length in a lead sheath and wherein at the end of the curing cycle the lead sheath is stripped from the cured hose and the lead reused; and, this basic process is widely used and referred to as the "lead press" method.

It has also been disclosed in U.S. Pat. No. 3,690,796 to provide continuous vulcanizing of a lead-sheath covered hose by moving such hose through a heating oven for vulcanizing purposes whereupon the lead sheath is continuously stripped from the hose as it leaves the oven.

Each of the above-described processes using lead is comparatively expensive due to the added operations made necessary because of the use of a lead sheath plus the substantial scrapping of hose lengths required because of damage often resulting upon removal of the lead sheath. In addition, special safety precautions must be taken when using lead in this manner.

It is also known to vulcanize reinforced elastomeric hose by immersing such hose in a bath of liquid such as water and disposing the hose and liquid bath in a pressurized heating environment, such as a steam filled vulcanizer, and such technique is disclosed in U.S. Pat. No. 3,824,141. This process may be practiced with the hose either filled with water or empty.

It is also known, as disclosed in U.S. Pat. No. 3,972,757, to build a hose which is to be vulcanized on a solid mandrel whereupon the hose and its mandrel are immersed in a bath of liquid and heated to thereby subject the hose wall to forces exerted in opposite directions by the heated liquid bath and the expanding mandrel.

SUMMARY

A feature of this invention is to provide a method of curing a tubular hose while confining the exterior surface of the hose employing a reuseable and preformed confining wall of a mold structure while heating the hose to curing temperatures to thereby provide a precision outside surface for the hose.

Another feature of this invention is to provide a method of the character mentioned including the steps of flowing fluid at an elevated temperature and pressure into the interior of the hose during heating of the mold structure to also provide curing of the hose from the interior of the hose outwardly through its tubular wall.

Another feature of this invention is to provide a method of curing a tubular hose of the character mentioned employing a mold structure which may be heated in a heating apparatus.

Another feature of this invention is to provide a method of curing a tubular hose of the character mentioned employing a mold structure which is basically self heating.

Another feature of this invention is to provide a method of curing a tubular hose of the character mentioned wherein the self heating of the mold structure is achieved employing a high temperature heating fluid which is circulated therethrough.

Therefore, it is an ojbect of this invention to provide an improved hose curing method having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
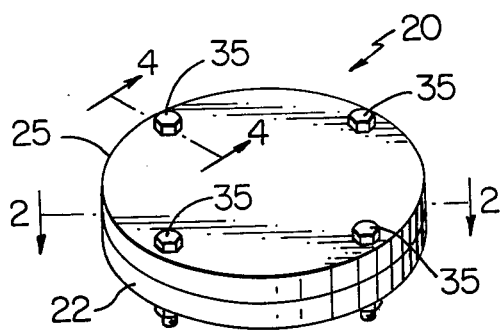
FIG. 1 is a perspective view illustrating one exemplary embodiment of the hose curing apparatus comprising a lower mold structure and an upper mold structure.
Figure 4:
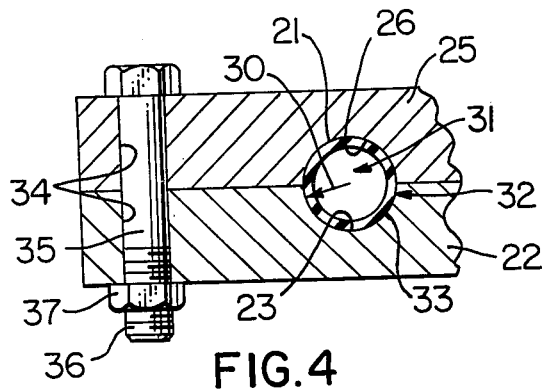
FIG. 4 is an enlarged fragmentary cross-sectional view taken essentially on the line 4—4 of FIG. 1 and particularly illustrating a hose to be cured disposed in position with such hose being empty except for presence of ambient air therewithin.

Reference is now made to FIGS. 1 and 4 of the drawing which illustrate one exemplary embodiment of a hose curing apparatus which is designated generally by the reference numeral 20 and such apparatus enables curing of a substantial length of hose such as a polymeric hose 21 in a comparatively compact volume thereby obviating the need for an oven or heating device of substantial length for the purpose of curing such substantial length hose while confining the outside surface thereof in order to define a precision outside surface therefor. In accordance with the teachings of this invention an apparatus and method are provided wherein a hose to be cured is confined within a tubular preformed spiral confining wall of a mold structure as will be explained in detail subsequently.

The hose in this example is shown by a simple rubber cross hatching throughout the wall thickness thereof and free of reinforcement, or the like; however, it is to be understood that such hose may be of any suitable vulcanizable or heat curable material known in the art and such hose may have an inner tubular portion, one or more tubular reinforcing layers or portions, and an outer cover portion.

Figure 2:
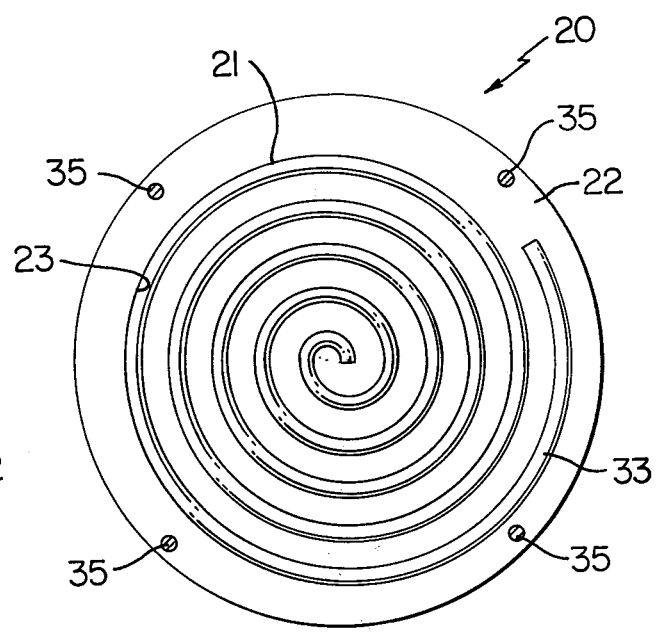
FIG. 2 is a view taken essentially on the line 2—2 of FIG. 1 particularly illustrating a hose within a spiral groove in the lower mold structure.

As seen in FIG. 2 the apparatus 20 comprises a first or lower mold structure 22 which has a first spiral groove 23 therein defining corresponding first wall 24 (FIG. 3) of substantially semicircular cross-sectional configuration throughout the spiral length thereof. The apparatus 20 also comprises second or upper mold structure 25 having a second spiral groove 26 therein defined by a corresponding second wall 27 of substantially semicircular cross-sectional configuration throughout its spiral length. The semicircular cross-sectional configurations of the first and second grooves have substantially the same radius as indicated by the radius 30 for example in the mold structure 25 in FIG. 4.

The mold structures 22 and 25 are adapted to be detachably fastened, as will be described subsequently, with the first and second grooves 23 and 26 respectively in aligned relation to define a tubular spiral groove which is designated generally by the reference numeral 31 and a confining wall 32 of circular cross section which is adapted to receive a hose such as the hose 21 to be cured therewithin. The fastened mold structures 22 and 25 are adapted to be heated with the confining wall 32 providing optimum support for the exterior surface 33 of the hose disposed in the tubular spiral groove 31 during curing which assures provision of a precision outside surface 33 on the hose 21. This reference to a precision outside surface is known in the art and refers to the fact that surface 33 is smooth, free of voids, and of precise circular cross section and outline.

Figure 3:
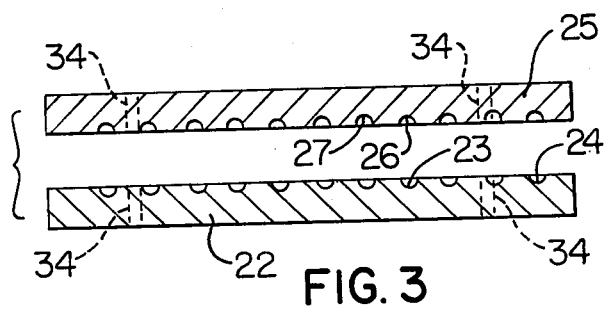
FIG. 3 is a cross-sectional view through the upper and lower mold structures shown empty in vertically spaced relation and minus means for fastening the two mold structures together.

As seen in FIG. 3 of the drawings each of the first 23 and second 26 spiral grooves is disposed in one plane. Accordingly, once the lower mold structure 22 and the upper mold structure 25 are fastened together with the grooves 23 and 26 in aligned relation as mentioned earlier, the tubular spiral groove 31 and a hose 21 therein are also disposed substantially in one plane.

The structures 22 and 25 may be made of any suitable material known in the art which is capable of being heated and subjected to high pressures sufficient to cure and shape a polymeric hose 21 to be disposed therein and preferably each of such structures is made of a high strength metal which may be in the form of a ferrous metal, aluminous metal, or any other suitable metal.

The mold structures 22 and 25 have means for fastening such structures together and although any suitble means known in the art may be provided for this purpose in this example of the invention a plurality of aligned openings each designated by the same reference numeral 34 (FIG. 4) are provided in the structures 22 and 25. The aligned openings 34 are particularly adapted to receive fastening bolts 35, or the like, therethrough which have threaded terminal ends 36 which are particularly adapted to threadedly receive threaded nuts 37 thereon for fastening the structures 22 and 25 together.

Figure 6:
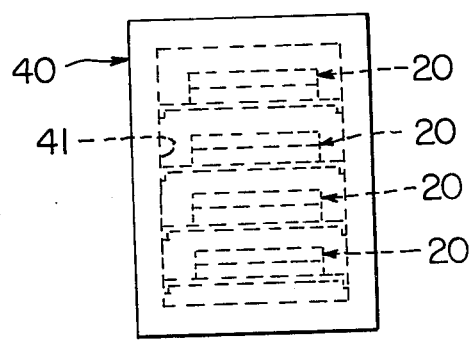
FIG. 6 is a schematic presentation particularly illustrating a plurality of hose curing apparatus of the type shown in FIG. 1 disposed on a supporting fixture within a curing oven for the purpose of vulcanizing or curing hose disposed within each curing apparatus.

The curing apparatus 20 with an uncured length of hose 21 disposed within tubular spiral groove 31 thereof and while confined by the spiral confining wall 32 is particularly adapted to be disposed in a suitable heating device 40 shown schematically by a rectangular block in FIG. 6. The heating device 40 may be in the form of a heating oven or tunnel 40 and is for the purpose of heating the uncured length of hose 21 thereby curing or vulcanizing such hose 21. The heating oven 40 is particularly adapted to receive at least one of the apparatus 20 and may receive a plurality of such apparatus. In this disclosure the oven 40 is shown with a suitable fixture 41 supporting a plurality of three apparatus 20 whereby three hose lengths 21 may be simultaneously cured in the same heating oven.

The heating oven 40 may be of any suitable type known in the art and may be heated by electricity, gas, or any other form of energy employed in heating ovens. Further, the heating oven 40 may comprise a chamber 41 capable of containing high temperature steam which is suitably circulated therethrough for the purpose of heating and curing hose contained within one or more of the mold apparatus 20.

The apparatus 20 may be used in curing a hose 21 which is empty (except for ambient air) or such apparatus may be used in curing a hose 21 containing a suitable mandrel M therein as shown in FIG. 4. The mandrel M is shown by cross-hatching as being a rubber mandrel; however, it will be appreciated that such mandrel may be made using any suitable material known in the art provided that it may be easily installed and removed and has flexibility enabling such mandrel and its hose 21 to be disposed in the spiral groove 31. The mandrel M serves to support the inside surface of the hose 21 during curing.

Other exemplary embodiments of the hose curing apparatus of this invention are illustrated in FIGS. 7 thru 12 and 13–14. The apparatus illustrated in FIGS. 7–12 and 13–14 are similar to the apparatus 20; therefore, such apparatus will be designated generally by the reference numeral 20A and 20B respectively and representative parts of each apparatus which are similar to corresponding parts of the apparatus 20 will be designated in the drawings by the same reference numerals as in the apparatus 20 (whether or not such representative parts are mentioned in the specification) followed by an associated letter designation, either A or B and not described again in detail. Only those component parts of each apparatus which are different from corresponding parts of the apparatus 20 will be designated by a new reference numeral also followed by the letter designation A and described in detail.

Figure 7:
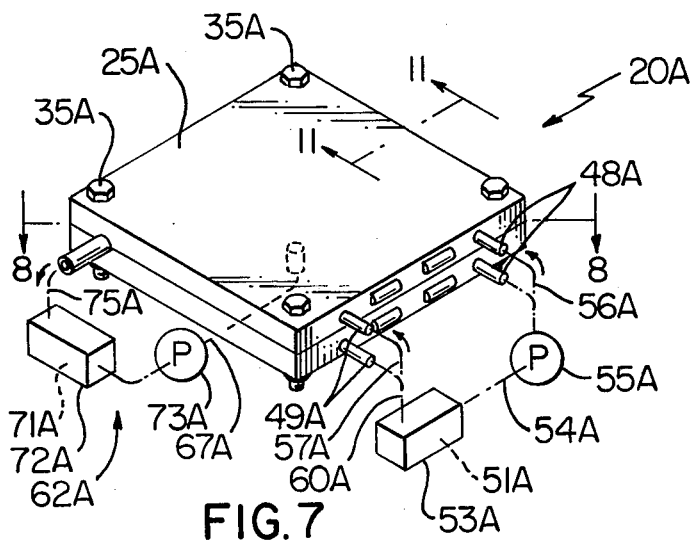
FIG. 7 is a view with parts in elevation and parts shown schematically particularly illustrating another exemplary embodiment of the hose curing apparatus.
Figure 9:
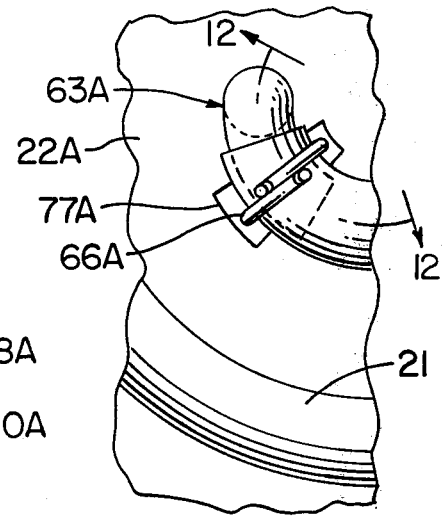
FIG. 9 is an enlarged fragmentary plan view with the upper mold structure removed particularly illustrating the manner of attaching the inner portion of a spirally wound hose to an L-shaped fitting carried by the lower mold structure to enable the flowing of fluid through such hose during curing thereof.
Figure 8:
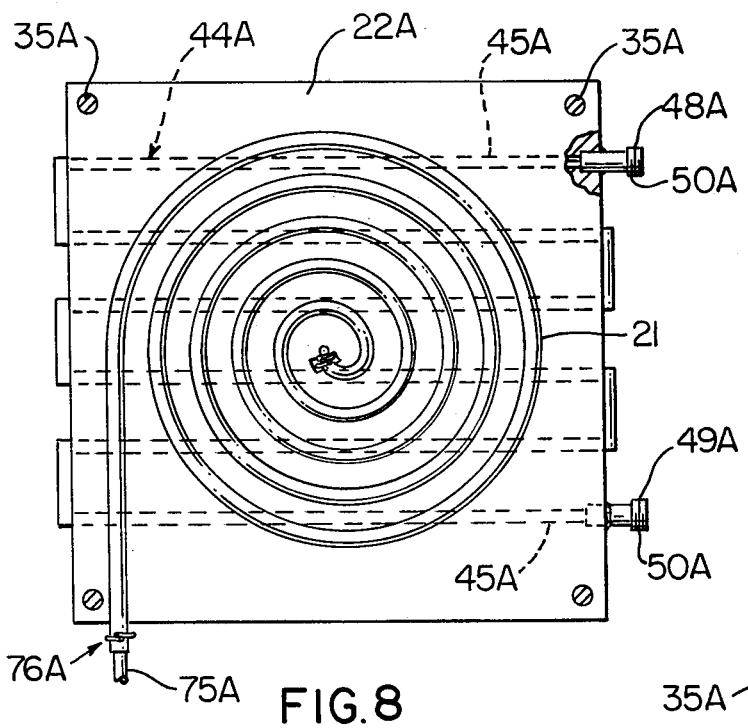
FIG. 8 is a view similar to FIG. 2 and taken essentially on the line 8—8 of FIG. 7 and particularly illustrating the lower mold member of the apparatus of FIG. 7.
Figure 11:
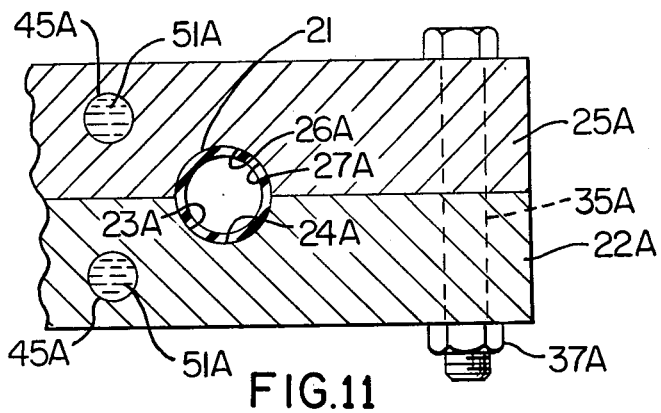
FIG. 11 is an enlarged fragmentary cross-sectional view taken essentially on the line 11—11 of FIG. 7.

As seen in FIG. 7, the apparatus 20A is of basically rectangular outline (square in this example) and has a lower mold structure 22A and an upper mold structure 25A provided with semicircular spiral walls 24A and 27A respectively defining semicircular spiral grooves 23A and 26A, FIG. 11. The apparatus 20A is provided with means which, in essence, provide self heating of the hose curing apparatus 20A and such self heating means comprises passage means in at least one of the mold structures either 22A or 25A. In this example, similar passage means is provided in each of the structures 22A and 25A and designated generally in each instance by the same reference numeral 44A. The passage means 44A will now be described for the lower mold structure 22A in connection with FIG. 8 and such description is basically fully applicable to the passage means for the upper mold structure 25A.

The outermost passages 45A are provided with conduits shown in this example as an inlet conduit 48A and an outlet conduit 49A and each conduit may be provided with a threaded connector 50A for connection of an associated conduit thereto. In this example a heating fluid 51A is provided and heated by a combination heating source and supply tank 53A and such fluid is conveyed through a supply pipe 54A by a high pressure pump 55A to an inlet manifold assembly 56A (FIG. 7) which introduces such high temperature fluid into inlet conduits 48A for continuous flow through the passages 45A of mold structures 25A and 22A. The high temperature fluid exits each mold structure 25A and 22A through its outlet conduit 49A and flows through an outlet manifold assembly 57A connected to the conduits 49A and to a return pipe 60A which returns the fluid 51A to the tank 53A. In this manner high temperature fluid 51A, which may be a liquid or steam, is continually circulated through the mold structures 22A and 25A to thereby provide heating of each structure and curing or vulcanizing of the hose 21 disposed therewithin. The fluid 51A is heated in dual purpose supply tank and heating device 53A and maintained at a predetermined temperature which is suitably controlled to provide the desired curing or vulcanizing of the hose 21.

The hose curing apparatus 20A may also include means for flowing or providing a fluid at an elevated temperature and pressure into the interior of the hose 21 during curing thereof and such means is designated generally by the reference numeral 62A in FIG. 7 of the drawings. The fluid flowing means 62A consists of an inlet pipe connector 63A, also see FIG. 12, which in this example is an L-shaped pipe connector having a pair of legs 64A and 65A extending from a bight thereof. The connector 63A is particularly adapted to have one end portion of the hose 21 clamped in position around its leg 64A by a suitable clamping device which in this example is shown as a typical standard spring-type clamp 66A. A fluid supply pipe 67A (FIG. 7) is connected to the leg 65A of the connector 63A by another spring-type clamp also designated by the reference numeral 66A and as shown at 70A in FIG. 12.

A suitable fluid 71A, for flow within the hose 21, is provided in a dual-purpose heating device and supply tank 72A and is supplied under pressure through the pipe 67A to the inlet end of the hose 21 by a pressure pump 73A which is operatively connected in the pipe 67A. The fluid 71A is controlled at a predetermined high temperature and pressure by suitable cooperating controls in the dual purpose device 72A and in the pump 73A.

Figure 10:
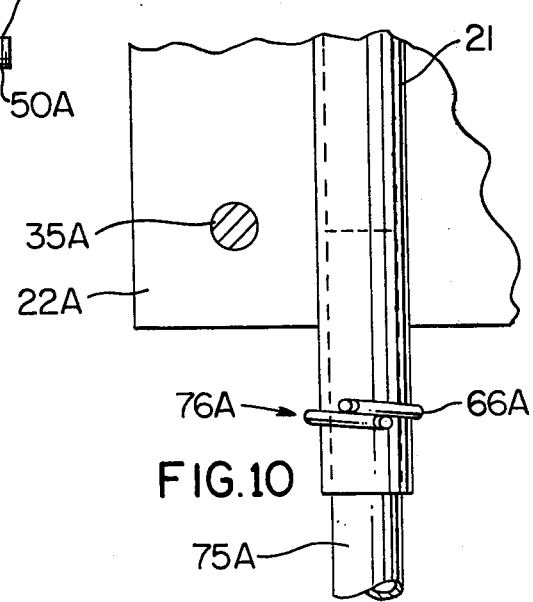
FIG. 10 is an enlarged fragmentary plan view similar to FIG. 9 illustrating the manner of attaching the outer portion of the spirally wound hose to a straight tubular fitting to enable flowing of fluid through such hose during curing thereof.

The hose 21 also has its outlet end portion connected to a suitable return conduit 75A (FIGS. 7 and 10) which may be in the form of a rigid pipe and although any suitable means may be provided for installing the pipe 75A in position, in this example of the invention the pipe is connected in fluid flow communication with the hose 21 by another spring-type clamp which is also designated by the reference numeral 66A and as shown at 76A in FIG. 10. The pipe 75A comprises the means 62A for flowing or providing fluid 71A at elevated temperature and pressure into the interior of the hose 21 during curing thereof.

The fluid 71A provides internal support for the hose 21 during curing and also provides a curing action for the hose 21 from its inside out, i.e. from the interior of the hose 21 outwardly through its wall. This curing action from the inside of the hose 21 outwardly takes place in a simultaneous manner with the curing which takes place from the outside of the hose 21 toward the inside of such hose, i.e. from the outside surface of the hose 21 radially inwardly toward the center of such hose. In this manner a dual heating action is provided in opposed directions and assures optimum curing of the hose 21 disposed within the apparatus 20A.

As previously described, the L-shaped connector 63A is provided for the central portion of the apparatus 20A for connecting the inlet end portion of the hose in fluid flow communication therewith and as previously described a spring-type hose clamp 66A is utilized for this purpose. Any suitable type hose clamp may be utilized; however, regardless of the hose clamp utilized a cutout 77A is provided in each of the mold structures 22A and 25A to assure that the clamp 66A may be received therewithin in a non-obstructing manner upon fastening the mold structures 22A and 25A with the fastening bolts or fasteners 35A.

Figure 5:
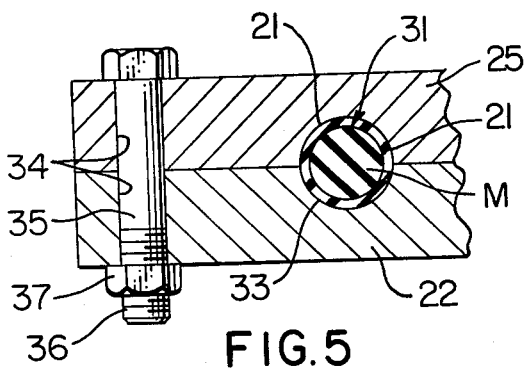
FIG. 5 is a view similar to FIG. 4 illustrating the hose in position within the curing apparatus of FIG. 1 with an easily removable solid flexible mandrel disposed within the hose for curing purposes.

In some applications of this invention it may not be desired to flow fluid through the hose 21 during curing thereof and in such applications the opposite ends of the hose 20 are not connected to the flowing means 62A and the hose is allowed to merely contain ambient air. Further, if desired, a solid flexible mandrel similar to the mandrel M described in FIG. 5 may be inserted in the hose 21 during curing thereof in the apparatus 20A without utilization of the flowing means 62A.

The flowing means 62A may also be provided and utilized with the apparatus 20 upon providing and making appropriate connections through the oven 40 so as to circulate fluid 71A through the apparatus 20 during heating of such apparatus in oven 40. In this instance the apparatus 20 also provides simultaneous curing in opposed directions through the wall of the hose by providing heating in the oven 40 as well as heating through the use of fluid 71A and flowing means 62A.

Figure 14:
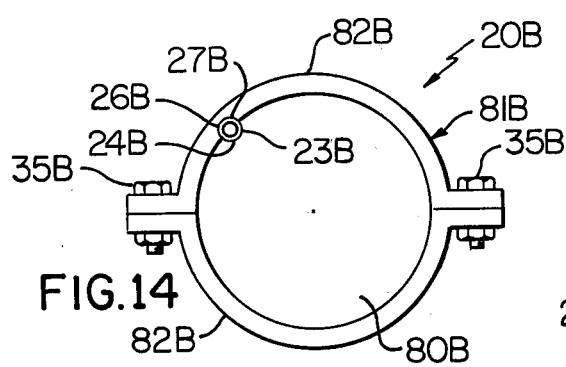
FIG. 14 is an end view of the hose curing apparatus of FIG. 13 in assembled relation and with a hose to be cured disposed therein.
Figure 12:
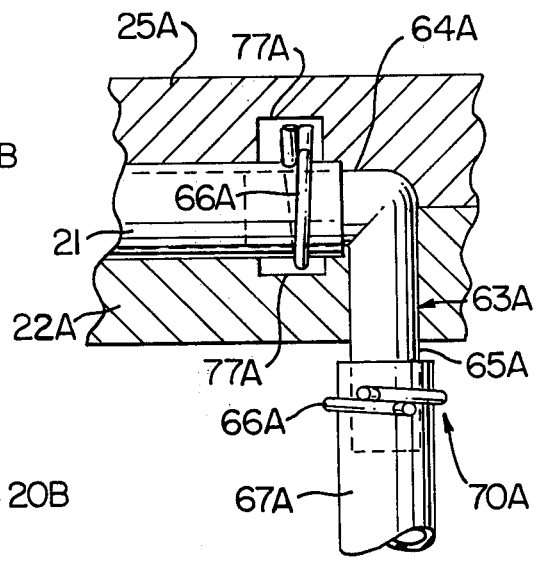
FIG. 12 is a view taken essentially on the line 12—12 of FIG. 9.
Figure 13:
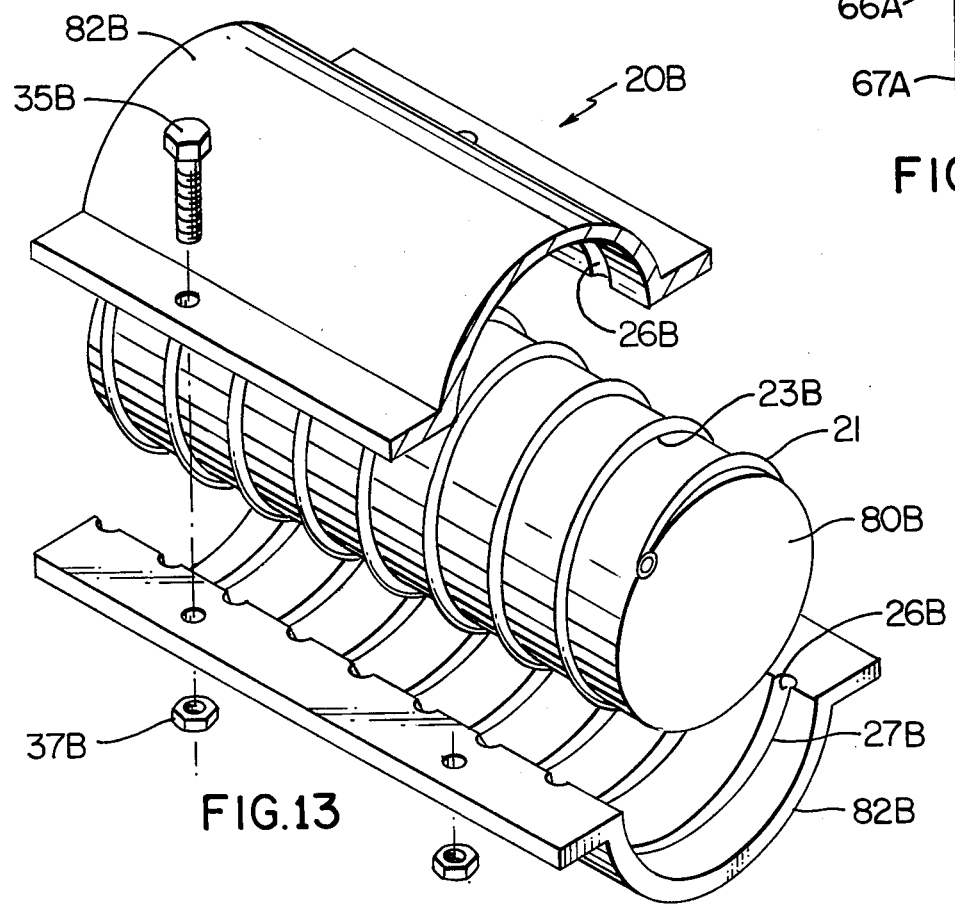
FIG. 13 is an exploded perspective view with parts broken away particularly illustrating another exemplary embodiment of a hose curing apparatus.

The hose curing apparatus 20B of FIGS. 13 and 14 comprises a first mold structure in this example which will be described as an inner mold structure 80B and an outer mold structure designated generally by the reference numeral 81B and consisting of two clam shell type mold halves each designated by the same reference numeral 82B. The first or inner mold structure 80B has a spiral groove 23B therein defined by a corresponding first wall 24B of substantially semicircular cross-sectional configuration throughout its length. Similarly, the mold structure 81B with its clam shell halves 82B in assembled relation and held together by fastening means 35B has a second spiral groove 26B therein defined by a corresponding second wall 27B of substantially semicircular cross-sectional configuration throughout its length with the semicircular cross-sectional configurations of the grooves 23B and 26B having substantially the same radius, in a similar manner as previously described for grooves 23 and 26.

Each of the first and second spiral grooves 23B and 26B respectively is disposed in a cylindrical path (right circular cylindrical path, in this example) at a fixed angle between adjoining turns so that the axial distance between adjoining turns of a particular groove is the same. More precisely each groove 23B and 26B may be considered a helical groove having a fixed helix angle. Thus, with the structures 80B and 81B (including its clam shell portions 82B) fastened together a tubular spiral is defined which extends in a cylindrical path and the hose therewithin is also disposed in a corresponding cylindrical path.

The hose curing apparatus 20B is shown comprised of a plurality of three mold structures consisting of the inner mold structure 80B and a pair of outer clam shell type mold structures 82B fastened together by fasteners 35B to define the outer surrounding structure 81B. The apparatus 20B may be disposed in oven 40 for curing of the hose 21 disposed therein. Similarly, as described in connection with the apparatus 20, the hose 21 may be empty containing only ambient air or such hose may contain a flexible mandrel as previously described.

It will also be appreciated that the apparatus 20B may be suitably modified to be in essence, self-heating by flowing a fluid therethrough in a similar manner as the apparatus 20A. This may be achieved by providing suitable passages in the centrally disposed mold structure 80B as well as in the outer structure 81B and placing such passages in fluid flow communication with a suitable system for heating and circulating such fluid. Similarly, means 62A may be provided in the apparatus 20B for flowing fluid through the hose 21 (as previously described) during the curing of such hose.

The various grooves for containing a hose 21 to be cured may be provided in each apparatus 20, 20A, and 20B utilizing any suitable technique known in the art. For example, the various spiral grooves may be machined, cast, or otherwise formed.

In this disclosure of the invention support structure, power sources, control means, and like items for each apparatus disclosed herein have not been illustrated and described. However, it is to be understood that these items may be suitably provided as is known in the art.

It should also be emphasized that each apparatus 20, 20A, and 20B may be employed to vulcanize or cure hose 21 made of any suitable polymeric material known in the art and such hose may be of the unreinforced or the reinforced type.

While present exemplary embodiments of this invention, and methods of practicing the same, have been illustrated and described, it will be recognized that this invention may be otherwise variously embodied and practiced within the scope of the following claims.

What is claimed is:

1. In a method of curing a tubular hose comprising the steps of confining the exterior surface of said hose and heating said hose to curing temperatures during said confining step to provide a precision outside surface therefor, the improvement comprising the steps of, forming a first spiral groove in a first mold structure to define a corresponding first wall of substantially semicircular cross-sectional configuration throughout its length, forming a second spiral groove in a second mold structure to define a corresponding second wall of substantially semicircular cross-sectional configuration throughout its length, said semicircular cross-sectional configurations of said first and second grooves having substantially the same radius, disposing a hose to be cured in said first spiral groove of said first mold structure, and detachably fastening said second mold structure against said first mold structure with said second groove in aligned relation with said first spiral groove to thereby define with said detachably fastened mold structures a confining wall consisting of said first and second walls and a tubular spiral groove of circular cross section having said hose disposed therewithin, said heating step comprising heating said mold structures with said hose confined by said confining wall in said tubular spiral groove to thereby provide optimum support for the exterior surface of said hose during curing which assures provision of said precision outside surface for said hose.

2. A method as set forth in claim 1 in which said steps of forming said first and second spiral grooves comprises forming each of said grooves in one plane so that upon fastening said first and second structures together during said detachably fastening step said tubular spiral groove and hose therein are disposed in one plane.

3. A method as set forth in claim 1 in which said steps of forming said first and second spiral grooves comprises forming each of said grooves in a cylindrical path such that upon fastening said first and second structures together during said detachably fastening step said tubular spiral groove and a hose therein are disposed in a cylindrical path.

4. A method as set forth in claim 1 in which said heating step comprises heating said detachably fastened mold structures in a heating apparatus to provide heating thereof and of said hose.

5. A method as set forth in claim 4 in which said heating apparatus is a heating oven.

6. A method as set forth in claim 1 and comprising the further step of providing a passage in at least one of said structures and said heating step comprises flowing a hot fluid through said passage to provide heating of said mold structures, the other mold structure fastened thereagainst, and simultaneous heating of said hose.

7. A method as set forth in claim 6 in which said step of flowing a hot fluid comprises flowing a hot liquid.

8. A method as set forth in claim 6 in which said step of flowing a hot fluid comprises flowing steam under pressure.

9. A method as set forth in claim 1 in which said heating step also comprises flowing a high temperature fluid through said hose during said heating of said mold structures to thereby provide curing of said hose from its inside out due to the action of said high temperature fluid flowing through said hose and from its outside in due to the heating of said mold structures.

10. A method as set forth in claim 6 in which said heating step also comprises flowing a high temperature fluid through said hose during flowing of hot fluid through said passage to provide heating of said mold structures to thereby provide curing of said hose from its inside out due to the action of said high temperature fluid flowing through said hose and from its outside in due to the flowing of hot fluid through said passage to provide heating of said mold structures.

* * * * *